Jan. 5, 1971     G. E. MORGAN, JR., ET AL     3,552,242
POWER OPERATED INDEXING TURRET
Filed Dec. 23, 1968     3 Sheets-Sheet 1
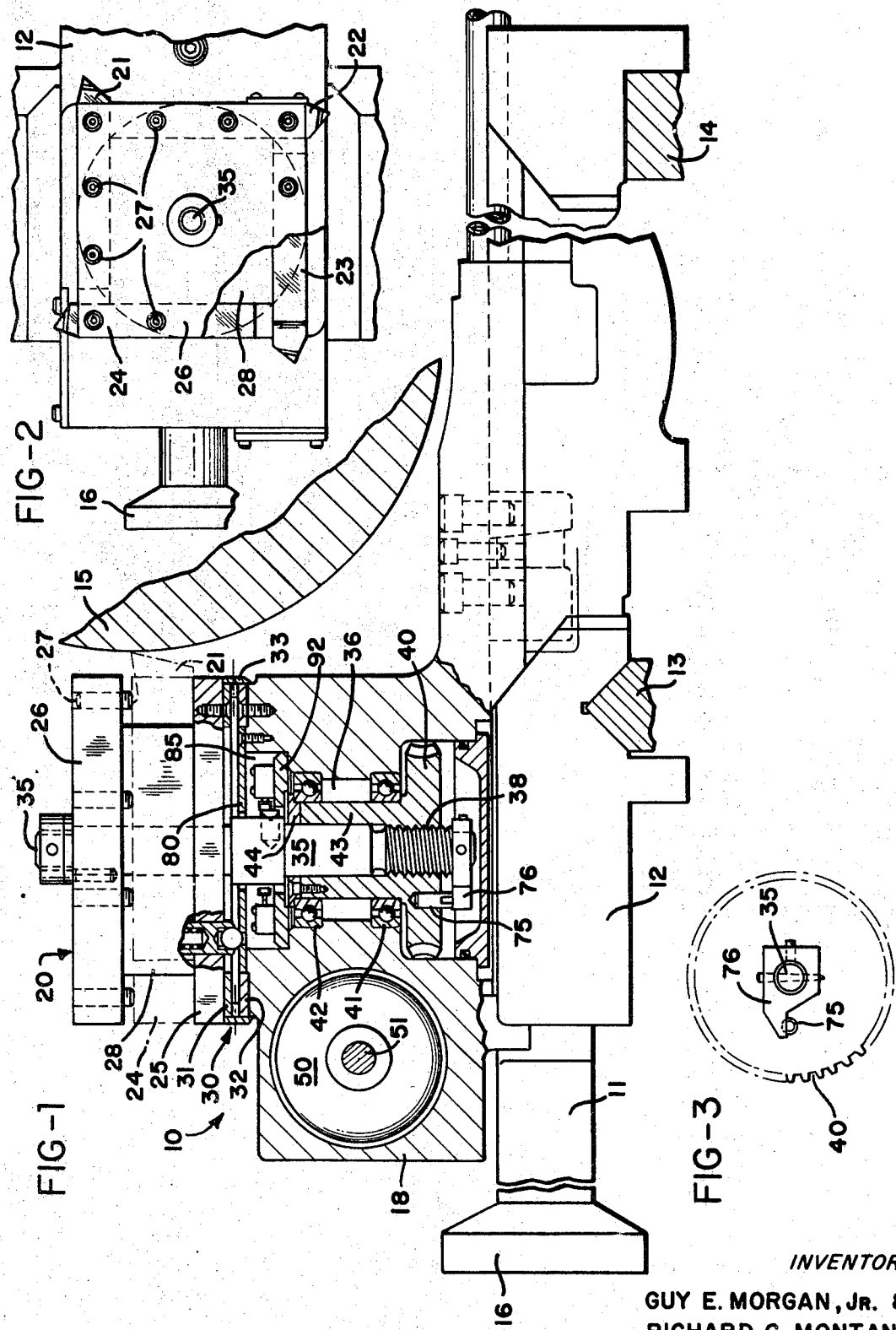
INVENTORS
GUY E. MORGAN, JR. &
RICHARD C. MONTANUS
BY Marechal, Biebel, French & Bugg
ATTORNEYS

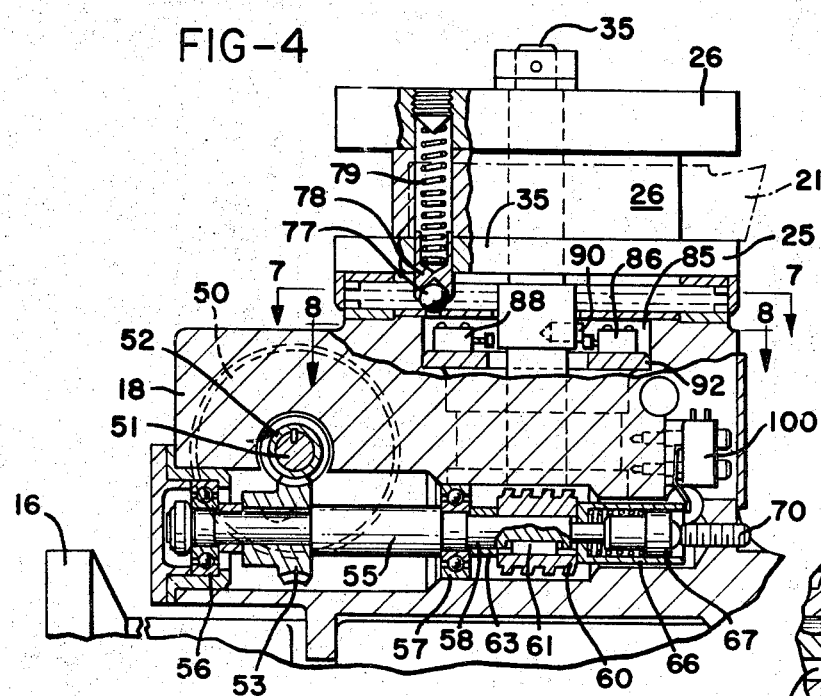
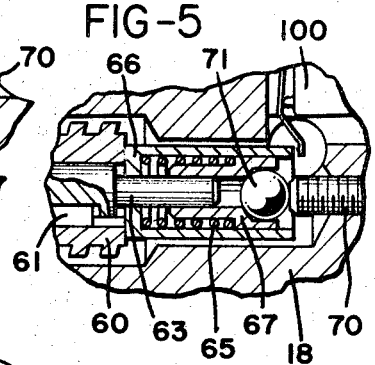
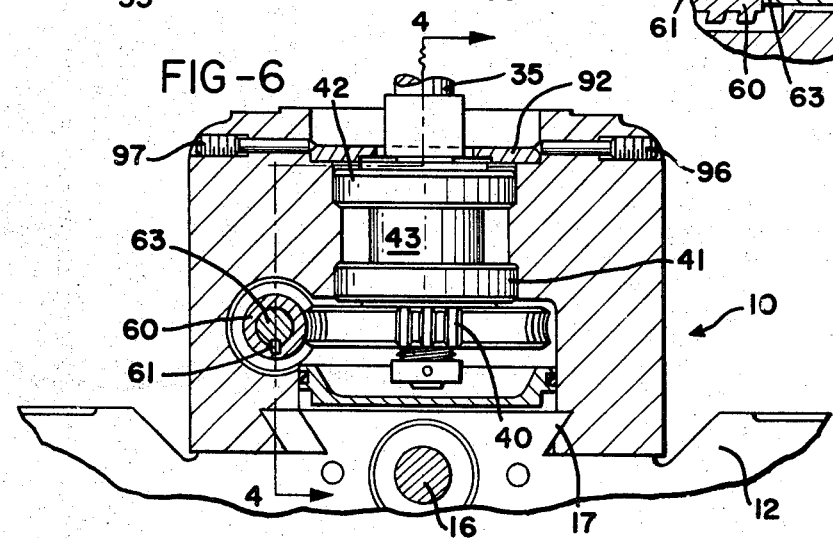
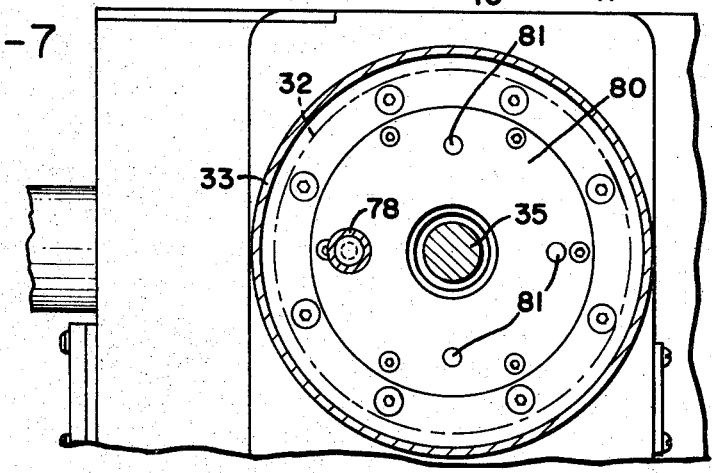

3,552,242
POWER OPERATED INDEXING TURRET
Guy E. Morgan, Jr., and Richard C. Montanus, Springfield, Ohio, assignors to The Springfield Machine Tool Company, Springfield, Ohio, a corporation of Ohio
Filed Dec. 23, 1968, Ser. No. 785,997
Int. Cl. B23b 29/28
U.S. Cl. 82—36                                5 Claims

ABSTRACT OF THE DISCLOSURE

An indexing turret includes a rotatably supported tool holder adapted to carry a plurality of tools in angularly spaced relation. Alignment means, including a first part fixed to the turret frame and a second part of the tool holder, aligns the tool holder to position a selected one of a plurality of tools in an operating position. The tool holder is supported by a shaft having a threaded end which cooperates with a motor driven gear to move the tool holder axially to separate the alignment means and then to rotate the tool holder. Restraining means holds the tool holder in the operating position as the motor driven gear reverses direction to move the shaft axially downwardly thus initially positioning the tool holder prior to engagement of the alignment means which then accurately aligns the tool holder and prevents further rotation of the tool holder. A switch automatically disconnects the motor when the tool holder has been thus positioned.

BACKGROUND OF THE INVENTION

This invention relates to a power operated machine tool turret for use with a lathe. Prior art indexing turrets have included an alignment means comprising a fixed first element and a second element mounted to rotate with the tool holder. The alignment means may be in the form of meshing gear teeth, and therefore, to rotate the tool holder, it is necessary to first separate the teeth, and then rotate the tool holder to place a selected one of the tools in an operating position. The present invention requires only a small number of elements to accomplish this function in contrast to prior art devices of the same type.

SUMMARY OF THE INVENTION

The power operated indexing turret of this invention includes a tool holder adapted to carry a plurality of tools in angularly spaced relation with the lower portion of the tool holder carrying one element of the alignment means. The mating or second element of the alignment means is fixed to the turret frame. The tool holder is first raised so that the two elements of the alignment means are separated and then rotated to place a selected one of the tools in the operating position.

The tool holder is supported by a shaft which extends downwardly into an opening in the turret frame and which has a threaded member formed in its end. A main gear, mounted for rotation within the turret frame, has an internal thread which cooperates with the threaded end of the shaft so that as relative rotational movement occurs between the gear and the shaft, the shaft will move axially.

A motor mounted within the turret frame drives a shaft upon which is mounted a worm gear which cooperates with the above mentioned main gear to cause rotation thereof. Thus, rotating the motor in a first direction will cause the main gear to rotate, and since the shaft is restrained from rotation by the alignment means, relative rotational movement will occur between the shaft and the gear to cause the shaft to move axially upwardly thus separating the two parts which form the alignment means. A restraining device is provided to prevent rotational movement of the tool holder after the alignment means has separated. The main gear, however, carries a pin which engages an extension of the shaft to overcome the restraining force thereby positively rotating the tool holder.

The restraining device includes a spring loaded ball mounted in the tool holder, and a fixed plate having a plurality of holes which receive a portion of the ball when the tool holder is in one of its operating positions. Thus, the force required to cause rotational movement is that required to force the ball upwardly against the spring bias by relative rotational movement between the tool holder and the turret frame.

A plurality of switches are mounted within the turret frame and are operated by an actuating arm extending from the shaft. When the selected tool reaches the operating position, the switch for that tool is actuated to cause the motor to reverse direction. Since the restraining device will be engaged at each operating position of the tool holder, the tool holder will be restrained from further rotational movement, and therefore relative movement again occurs between the gear and the shaft to move the shaft axially, this time in the opposite direction, thus bringing the alignment means into engagement. This not only aligns the tool holder precisely with respect to the work, but also provides a rigid mounting for the tool holder so that the forces transmitted from the work through the tool to the tool holder will not cause rotational movement of the tool holder.

Once the tool holder is seated, the main gear will be constrained from rotational movement. In the present invention, this will cause the worm gear driving the main gear to move axially on the drive shaft against a spring bias to actuate a microswitch which disconnects the power to the motor. The tension on the spring restraining the lateral movement of the worm gear will determine the binding force which the tool holder exerts against the tool frame.

It is therefore an object of this invention to provide an improved indexing turret as described above where the tool holder may be accurately positioned in any one of a plurality of tools in an operating position and which includes a simplified indexing apparatus requiring fewer parts than heretofore possible with prior art indexing turrets; to provide an indexing turret where the tool holder is supported by a shaft having a threaded end portion which cooperates with an internal thread on a motor driven gear so that as relative rotational movement occurs between the shaft and the gear, the tool holder will move axially to separate the alignment means, and where the driven gear and the shaft include a positive connection whereby a selected tool is rotated to the operating position, with reversal of the direction of movement of the driven gear causing the tool holder to move axially in the other direction to engage the alignment means and thereafter to remove power from the motor.

BRIEF DESCRIPTION OF THE DRAWINGS

FIG. 1 is an elevational view showing the indexing turret of this invention partly in cross section;

FIG. 2 is a plan view of the indexing turret showing the tools mounted in the tool holder;

FIG. 3 is a view showing an extension on the shaft supporting the tool holder which cooperates with a pin on the motor driven gear to overcome the force which restrains the tool holder from rotational movement after the alignment means are separated;

FIG. 4 is a cross sectional elevational view of the indexing turret showing a worm gear mounted on a shaft driven by a motor;

FIG. 5 is a detail cross sectional view showing a spring bias means to restrain lateral movement of the worm gear in one direction;

FIG. 6 is an end view showing a portion of the indexing turret in cross section;

FIG. 7 is a plan view taken along line 7—7 in FIG. 4;

DESCRIPTION OF THE PREFERRED EMBODIMENT

Figure 8:
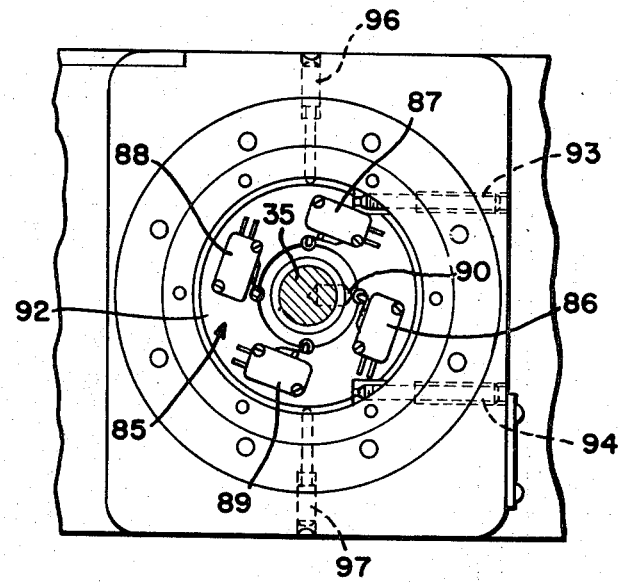
FIG. 8 is a plan view taken along line 8—8 in FIG. 4.

Referring now to the dawings, and particularly to FIG. 1, an indexing turret, shown generally at 10, is mounted on a carriage 12 which is supported on a pair of ways 13 and 14 for movement on a lathe. A workpiece 15 is shown in the operating position relative to the turret 10. A tool is moved into cutting relationship with the workpiece 15 by rotating a handle 16 which moves the turret 10 across the carriage 12. As shown in FIG. 6, the turret 10 is slidingly supported on way 17 of the carriage 12.

The indexing turret 10 includes a frame 18 upon which is mounted a tool holder 20 which, in the preferred embodiment, carries four tools 21-24 in angularly spaced relation. In FIG. 2, tool 21 is shown in the operating position. The tool holder includes a bottom flange 25 upon which the tools rest, a top flange 26 having a plurality of threaded openings therein through which screws 27 extend to clamp each tool in position, and a separating block 28 against which the tools are placed to align them properly prior to being clamped in place. In FIG. 1, the tool 23 has been removed to more clearly show the structural arrangement of the tool holder.

The tool holder 20 is aligned relative to the frame 18 by an alignment means 30 which includes a first member 31 fixedly attached to the bottom of the flange 25 by screws or other suitable means, and a corresponding mating member 32 which is fixedly attached to the frame 18. Both members 31 and 32 are circular and have teeth formed thereon which therefore serve to position the tool holder accurately when in engagement. The alignment means is protected by a shield 33 which extends downwardly from the lower flange 25 of the tool holder. This shield keeps the turnings from the workpiece or other foreign particles from becoming lodged between the teeth of the alignment means.

Means are provided to separate the alignment means and to rotate the tool holder to a selected one of its operating positions. This means includes a shaft 35 which extends through the central portion of the tool holder 20 and through a cavity 36 formed in the frame 18. The upper portion of the shaft 35 is fixedly attached to the flange 26 while the lower portion of the shaft includes an integrally formed threaded member 38. As shown in FIG. 1, that part of the shaft within the cavity 36 is surrounded by a motor drive gear 40.

The main gear 40 has an internal thread formed therein to cooperate with the threaded member 38 so that relative movement between the shaft 35 and the gear will cause the shaft 35 to move axially.

The gear 40 is prevented from moving axially upwardly by a bearing 41, and from moving axially downwardly by a bearing 42. The inner race of each of these bearings surrounds an elongated shank 43 of the gear 40, and a flange 44 is secured by screws to the shank 43 to cooperate with the inner race of the bearing 42 to prevent downward movement of the gear, while the inner race of bearing 41 rests against an integral flange 45.

A motor 50 is mounted within the frame 18 and includes shaft 51 upon which is mounted worm 52, as shown in FIG. 4. The worm 52 meshes with a gear 53 which is secured to a shaft 55 which extends a right angles to and below the motor shaft 51. The shaft 55 is journaled by bearings 56 and 57 and is restricted from axial movement by these bearings.

The shaft 55 includes an extension 58 upon which is slidably mounted a worm 60. The worm 60, as shown in FIG. 6, meshes with the gear 40 thus causing the gear 40 to rotate in a direction determined by the direction of rotation of the motor 50.

Keyways are cut into both the extension 58 and the worm 60, and a key 61 placed within these slots to prevent relative rotational movement between the worm 60 and the shaft 58 while permitting lateral movement of the worm. However, worm 60 is prevented from moving laterally to the left, as shown in FIG. 4, by a ring 63 which surrounds the extension 58 and which abuts the worm 60 and the bearing 57.

The worm 60 is restrained from lateral movement to the right, as shown in FIGS. 4 and 5, by spring 65. The spring 65 is recessed into a cup member 66 which abuts the right end of the worm 60 and which is open at its other end. Within the cup member 66 is a plug 67 which has a central opening surrounding a further extension 68 of the shaft 55. A screw 70 extends from the frame 18 and abuts a ball 71 which is received into an opening in the plug member 67. Thus, the spring bias against the worm 60 is determined by the position of the screw 70. The ball 71 permits relative rotational movement between the screw 70 and the plug 67 without causing the screw to rotate and thus alter the spring bias.

In operation, therefore, the motor 50 is energized to rotate in a forward direction, thus causing the shaft 55 to rotate the worm gear 60 and the gear 40. Since the tool holder 20 is prevented from rotational movement by the alignment means 30, relative rotational movement will occur between the shaft 35 and the worm gear 40 to move the shaft 35 axially upwardly, thus separating the alignment means. After the alignment means are separated, a pin 75, mounted in the gear 40, moves against an extension 76 which is secured to the lower end of the shaft 35. Therefore, the pin 75 and the extension 76 form means for rotating the shaft simultaneously with the gear after the two parts forming the alignment means have separated.

After the alignment means 30 are separated, the tool holder is restrained from rotational movement until the pin 75 engages the shaft extension 76 by means of a spring loaded detent member which is carried by the tool holder 20. As shown in FIG. 4, a ball 77 is held in an assembly 78 which is biased downwardly by a spring 79. A screw holds the spring 79 within the tool holder. A plate 80, (FIG. 7) mounted on the frame 18 by screws or other suitable means, has formed therein a plurality of holes 81 which are so positioned relative to the ball 77 that the ball will partially enter the hole when any of the tools are in an operating position. The holes 81 are of such a diameter that only a small portion of the ball rests therein. The force required to overcome this restraining means is therefore the force required to move the ball upwardly against the spring 79.

After the tool holder 20 is raised and the alignment means 30 are separated, the tool holder is rotated simultaneously with the gear 40. Any one of the tools 21 through 24 may be placed in the operating position by selection of one of a plurality of switches mounted within the cavity 85 in the frame 18. In the preferred embodiment, four switches 86 through 89 are placed around the shaft 35 and these switches are actuated in sequence by an extension 90 on the shaft 35, and therefore indicate which tool is in the operating position. As will be explained later, these switches, when energized, function to cause the motor 50 to reverse direction thus positioning the tool holder in a selected one of its operating positions. The extension 90, as shown in FIG. 1, is arranged so that it will engage the rollers on the switches when the shaft 35 is in its uppermost position.

The switches 86 through 89 are mounted on a plate 92 within the cavity 85 and may be positioned relative to the tool holder by adjusting a pair of screws 93 and 94 which extend through the frame and which abut cut away portions on either side of the plate. This permits the plate to be rotated slightly relative to the tool holder so that, when actuated, these switches will properly position the tool holder. The plate 92 is secured in place by screws 96 and 97.

When the tool holder 20 has reached the preselected operating position, the ball 77 will be received partially into one of the openings 81 in the plate 80 to align the tool holder initially. The direction of rotation of the motor 50 is then reversed and the shaft 35 moves downwardly due to relative rotational movement between the shaft and the gear 40, thus bringing the two parts 31 and 32 of the alignment means 30 together. When the tool holder 20 is at its lowermost position, and the worm gear 60 will move to the right against the bias provided by the spring 65 due to an increase in the load on gear 40.

When the worm gear 60 moves to the right, it pushes the cup member 66 to the right and moves the actuating arm to open switch 100. As will be explained, this switch terminates the operation of the indexing cycle.

Figure 9:
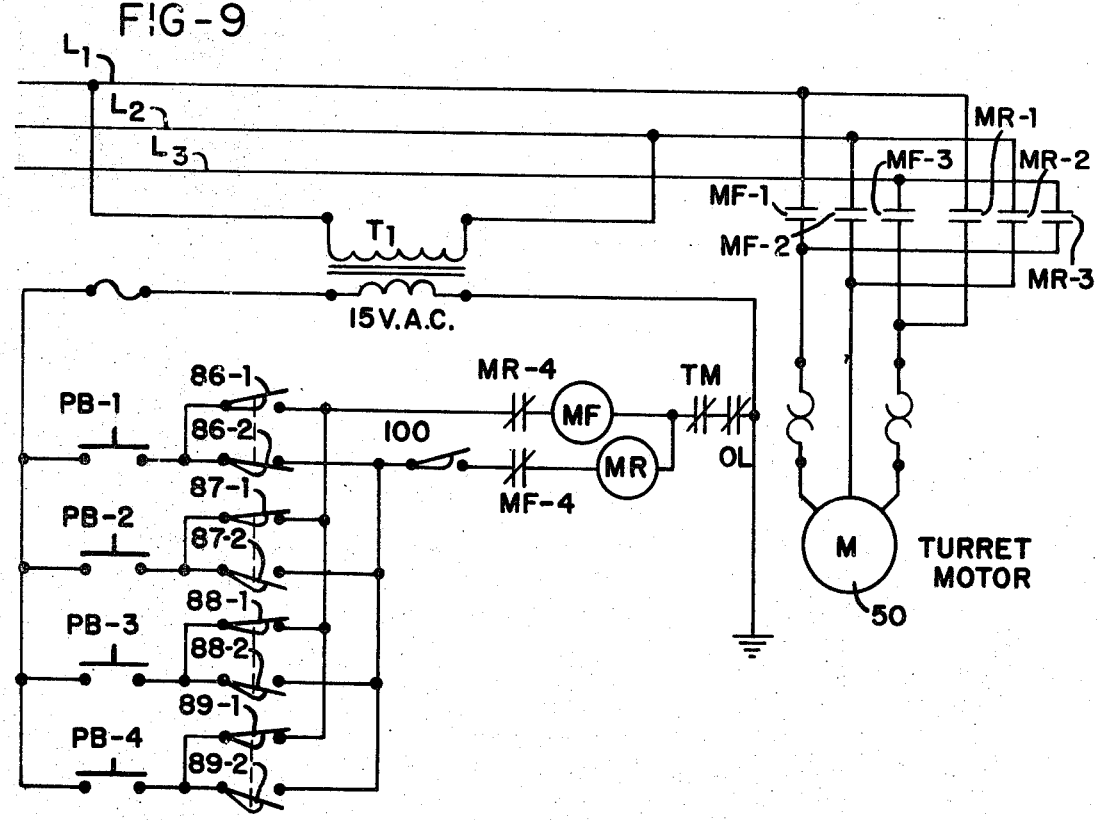
FIG. 9 is an electrical schematic diagram showing the circuit used to control the motor which drives the indexing turret in this invention.

Reference is now made to the electrical schematic diagram in FIG. 9. Power is applied on lines L1, L2 and L3 to the turret motor 50 through either the contacts MF1, MF2 and MF3 of relay MF to drive the motor in the forward direction or through contacts MR1, MR2 and MR3 of relay MR to drive the motor in the reverse direction. A transformer T1 is connected across lines L1 and L2 and supplies 115 volts AC from its secondary winding to the control circuit. The machine operator has access to four push buttons labeled with a number corresponding to the tool to be used.

In FIG. 9, the tool 21 is shown in the operating position, and therefore switch 86 is actuated. Assuming that the operator desires to use the tool 24, he will depress the push button switch PB-4 which causes current to flow through the contacts of that switch, through the normally closed contacts 89-1 of switch 89 and through the normally closed contacts MR4 of the motor reversing relay MR to the coil of the motor forward relay MF. When energized, the forward motor starter MF closes the contacts MF1, MF2 and MF3 supplying power to the turret motor causing it to rotate in the forward direction. As explained above, this causes the tool holder 20 to raise and then begin movement in the counterclockwise direction, as viewed in FIG. 2. This movement continues until the tool holder arrives at the preselected operating position where the extension 90 actuates the switch 89 causing its contacts 89-1 and 89-2 to move to a position opposite that now shown in FIG. 9. Contacts 89-1 are then opened, deenergizing the coil MF and removing current from the motor. At the same time, the normally open contacts 89-2 close to supply current through the normally closed contacts of the switch 100, the normally closed contacts MF4 of the motor forward relay to energize the motor reversing relay MR. This causes contacts MR1, MR2 and MR3 to close and cause the motor 50 to rotate in the opposite direction. Thus, the tool holder 20 is lowered and secured at the preselected operating position. When the tool holder 20 reaches its lowermost position, the switch 100 will be actuated by the lateral movement of the worm gear 60 to the right, thus to open the circuit to the motor reversing relay MR, and to disconnect power to the motor. The operator may now release the push button PB-1. The contacts labeled TM and OL are overload contacts which protect the motor from excessive current.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for indexing a selected one of a plurality of tools into an operating position relative to a workpiece into an operating position relative to a workpiece in- including a tool holder adapted to carry a plurality of tools in angularly spaced relation;

alignment means for accurately aligning said tool holder in a selected one of a plurality of predetermined operating positions, said alignment means, when engaged, preventing rotation of said tool holder;

means to separate said alignment means and rotate said tool holder to position one of said tools in said operating position;

the improvement characterized by a shaft rotatably supporting said tool holder;

a threaded member mounted to rotate with said shaft;

a gear mounted for rotation having an internal thread cooperating with said threaded member, said gear being restrained from axial movement so that as relative movement occurs in a first direction between said gear and said shaft, the shaft will be moved axially in a first direction to separate said alignment means, and as relative movement occurs in a second direction, the shaft will be moved axially in a second direction to engage said alignment means;

a motor operably connected to rotate said gear;

means for providing a force restraining the rotational movement of said tool holder when said alignment means is separated;

means for rotating said shaft simultaneously with said gear after the alignment means has separated, said rotating means overcoming the force created by said restraining means so that said tool holder rotates with said shaft; and means for reversing the direction of rotation of said motor to move said shaft axially in a second direction thereby engaging said alignment means when said tool holder has been rotated to its preselected operating position.

2. The apparatus defined in claim 1 wherein said restraining means includes a spring biased ball carried by said tool holder;

a fixed plate having a plurality of holes to receive said ball; and said holes being arranged to position said tool holder in said preselected position while said alignment means is separated.

3. The apparatus defined in claim 1 further includes means for disconnecting said motor after said shaft has moved axially in said second direction to engage said alignment means.

4. The apparatus defined in claim 3 wherein said motor disconnecting means includes a motor shaft driven by said motor;

a worm gear slidably supported by said motor shaft and in meshing engagement with said gear;

stop means to prevent said worm gear from lateral movement along said motor shaft in a first direction when said gear is rotated in a first direction;

means providing a resilient biasing force for restraining the worm gear from lateral movement along said motor shaft in a second direction when said gear is rotated in a second direction;

switch means actuated by said worm gear moving laterally in said second direction when said tool holder has returned to its operating position, said switch means causing said motor to be discontinued.

5. The apparatus defined in claim 1 wherein said reversing means includes a plurality of switch means in angularly spaced relation surrounding said shaft, and means rotatable with said shaft to actuate each of said switch means when said tool holder is rotated to a corresponding one of its operating positions.

References Cited

UNITED STATES PATENTS

| | | | |
|---|---|---|---|
| 2,389,668 | 11/1945 | Johnson | 74—823 |
| 2,979,971 | 4/1961 | Darash | 82—36X |
| 3,222,955 | 12/1965 | Ross et al. | 74—826 |

LEONIDAS VLACHOS, Primary Examiner

U.S. Cl. X.R.

74—826